US006025045A

United States Patent [19]

Langeman

[11] Patent Number: 6,025,045

[45] Date of Patent: Feb. 15, 2000

[54] EDGE TRIMMING TAPE AND METHOD OF MANUFACTURE

[76] Inventor: Gary D. Langeman, R.R. #2 386, Ruthven, Ontario, Canada, NOP 2GO

[21] Appl. No.: 08/810,606

[22] Filed: Feb. 28, 1997

[30] Foreign Application Priority Data

Feb. 28, 1996 [CA] Canada .................................. 2170573

[51] Int. Cl.[7] ........................................................ B32B 3/04

[52] U.S. Cl. ........................ 428/40.1; 206/617; 428/41.8; 428/42.2; 428/42.3; 428/124; 428/194

[58] Field of Search .................................. 428/40.1, 41.8, 428/42.2, 42.3, 194, 124; 118/505, 504; 206/617

[56] References Cited

U.S. PATENT DOCUMENTS

| | | | |
|---|---|---|---|
| 2,005,665 | 6/1935 | Saignier | 229/51 |
| 2,771,385 | 11/1956 | Humphner | 154/53.5 |
| 3,034,941 | 5/1962 | Hessenthaler et al. | 154/46 |
| 3,130,078 | 4/1964 | Lewis et al. | 118/505 |
| 3,501,797 | 3/1970 | Nappi | 15/215 |
| 4,255,469 | 3/1981 | McGinness | 427/282 |
| 4,921,028 | 5/1990 | Schwartz | 150/155 |
| 5,049,445 | 9/1991 | Arvidsson | 428/352 |
| 5,489,458 | 2/1996 | Sato et al. | 428/40 |

OTHER PUBLICATIONS

Copy of the International Search Report dated Jun. 12, 1997.

*Primary Examiner*—Nasser Ahmad
*Attorney, Agent, or Firm*—Nields, Lemack & Dingman

[57] ABSTRACT

The present invention provides an adhesive filament-bearing adhesive tape comprising an adhesive substrate adapted to be releasably adhered to a surface to be coated, and a filament releasably adhered to an edge of that substrate, that is useful in trimming a coating applied to a surface. The invention further provides a method of trimming a coating applied to a surface comprising applying to the surface to be coated a masking material to define the area to be coated and a filament of material of sufficient tensile strength to cut the coating material; applying coating material to the surface; allowing the coating material to dry or cure until it obtains sufficient strength to hold a cut edge; and drawing the filament through the coating to cut the coating. Finally, the present invention provides an apparatus for making a filament-bearing adhesive tape comprising means for folding an adhesive substrate along a predefined line; means for applying a filament to the interior of the fold so formed; and means for closing said fold to retain said filament at the edge of the filament bearing tape.

3 Claims, 3 Drawing Sheets

10
11
13
14
15
16
21
23
24
26
30
31
32
34
35
37
39
40
41
42
43
44
48
51
A
B

EDGE TRIMMING TAPE AND METHOD OF MANUFACTURE

TECHNICAL FIELD

The present invention relates to a method of trimming or cutting a coating material that may be applied to a relatively smooth surface, and is particularly useful for trimming or cutting a curable material such as polyurethane or paint without damaging the surface to which it is applied.

BACKGROUND ART

It has become increasingly common to apply a curable coating, such as a polyurethane, to an exposed surface such as a wall, floor or automobile body to offer protection against, for example, corrosion, moisture or abrasion. These coatings are often applied by spraying, rolling or painting the coating material on to the surface to be protected, and allowing the coating material to dry or cure in place.

Some polyurethane coatings as well as other high strength coatings are available for application in the form of a single component formulation.

Many commercially useful coating materials, such as paints, epoxies, varnishes, polyurethanes and other coating materials are available in the form of, and are formed from, two or more components which may be blended together immediately before application and applied to the surface to be coated by a dynamic mix spray gun. The components may be separately fed to the spray gun and mixed in the gun just before the coating material is sprayed on the surface to be coated. This procedure, described in more detail in, for example, the applicant's U.S. Pat. No. 5,388,761, provides a composition which will react on mixing to form a generally stable, substantially solid material soon after application to the surface to be coated, thus minimizing drying and curing time, and permitting the application of the coating material to vertical and other non-horizontal surfaces. A properly trained operator can apply a coating of relatively uniform thickness to almost any appropriate surface.

In the case of some of these materials, such as polyurethane, the liquid components may be selected to react with one another almost immediately to create an essentially solid, form-retaining product soon after contact with the surface to be coated. Therefore, the components are most commonly kept separated from one another and mixed together in the spray gun immediately before a coating of the material is to be applied to the surface.

The ratio of various components can be varied to provide the desired curing time and rate. For example, in the case of polyurethane, the two relevant components—isocyanate and polyol—may be prepared in a variety of formulations depending upon the application. Such formulations are often intended to be combined in the 1:1 ratio by volume. However, other mixing ratios, such as 5:1 and 1:5, are not uncommon. The appropriate mixing ratio for any particular application may also vary with environmental conditions, such as temperature, which affects the reactivity of the materials, viscosity or other physical or chemical properties of the components of the mixture.

Applying such a rapidly drying or curing mixture to a surface to be protected permits a quick and relatively uniform application of the coating material to the entire surface and shortens the time required before the coated surface may be put to its normal or intended use. However, the coating must be applied relatively quickly, and applying the mixture by spraying, rolling or painting often requires masking those areas of the surface that are not intended to be coated before application of the coating, to protect those areas from unwanted coating material. Subsequent trimming of the coating material is common to remove unwanted coating material after the coating is applied, either to provide access to the areas that ought not to be coated, such as drains or electrical outlets, or to provide a neat appearance.

One particularly useful application is the increasingly common use of spray-on coatings for liners of boxes of pick-up trucks, and interiors of vans and trucks. This application is one in which the appearance of both the coated and uncoated surfaces is particularly important, and one in which a significant amount of masking may be required. Such a spray-n liner provides protection against the corrosive elements in the atmosphere and also against the abrasion caused by various materials that may be carried in the truck, van or box.

These spray on linings have several advantages over the more conventional protection afforded by premoulded plastic liners that are inserted into the box of a pickup truck. Premoulded plastic liners do not form a water-tight seal with the body of the truck, and permit the entry of water and dirt between the liner and the truck body. This may result in substantial abrasion and corrosion to the body of the truck which is, however, not visible through the opaque liner. The loose fit of the liner results in movement of the liner against the body of the truck, increasing the abrasion damage to the truck body.

Spray-on linings, however, provide a coating, typically of polyurethane, that is tightly bonded to the truck body, and which does not permit the entry of dirt or moisture between the lining and the truck body. Also, the flexible properties of the polyurethane coating offer a slip resistant as well as protective surface for the cargo to ride on. In the case of a lining for a pick up truck box, the lining is generally applied to the floor and side walls of the box and to some portion of the top rails and side body. It is important to provide a neat edge along the perimeter of the box. The rear of the box is generally masked to avoid applying any coating to the hinges and latching mechanism, and the tail gate is generally removed and the surface facing into the box of the pickup truck is coated separately. Both this surface, and the ends of the side and bottom surfaces of the box must be trimmed to permit proper opening and closing of the door as well as providing a neat appearance.

As in the case of painting or other surface applications, the surface area that is actually covered by the sprayed on material may be determined by masking the surface that is not intended to be covered with masking tape and other commonly used masking material. The material to be sprayed on the surface is intended to adhere firmly to the surface. The use of masking materials prevents contact between those portions of the surface that are not intended to be covered, and allows the rapid application of the material only to the surface which is intended to be covered. In these operations, masking tape or other masking material is used, which has an adhesive coating that is sufficiently strong to hold the masking material in place while it is intended to be there, and yet permits the easy removal of the masking material when it is no longer required, while leaving no significant amount of adhesive material on the surface to be protected. The use of the term adhesive throughout this application generally refers to a removable adhesive having these general properties.

After the application of the coating material, however, some trimming is required to remove the coating material.

This is commonly done by cutting the coating material along the boundary of the masked area, to separate the coating that is to remain in place, and which will be firmly bonded to the truck body, from the coating material that is to be removed, which should not have contacted the truck body and which should be separated from the truck body by the masking material. Once this separation is made, it is possible to remove the masking tape or other masking material, and the unwanted surface coating. It is thus important in such a trimming application to cut precisely along the edge of the masking material so that no masking material is left on the surface beneath the coating. This would result in a portion or area of coating material that is not adhered to the surface to be protected, which could subsequently result in the peeling of the protective coating from the surface. Conversely, if the cut is away from the masked edge and into the area which is intended to be coated, removal of the coating from the masked area will be more difficult and may result in the removal of paint from the truck body.

One difficulty posed by the use of the relatively thick, abrasion-resistant coatings, such as polyurethane coatings, is the difficulty in locating the edges to be trimmed. Furthermore, while the removal of masking material used in painting effectively acts as an edge trimming method, tearing or cutting the paint layer as the masking material is removed, conventional masking materials will not tear through the polyurethane coating, and often cannot be located under the relatively thicker coatings of poyurethane such as those used to line a truck box.

Various methods have been developed to overcome this difficulty. For example, several layers of masking tape may be used and layers removed sequentially so that each layer of masking tape removes individual thin layers of the coating material before the coating begins to cure. This procedure generally requires extra personnel, is a time-consuming method that leaves a relatively rough edge to the coating material as well as an inferior bond at the extreme edge of the coating.

The most common way of trimming such coatings is simply by cutting the coating along the edge of the masking material with a knife or other sharp instrument. This requires, first of all, locating the edge of the masking material, and then cutting the protective coating with a sharp instrument such as a knife. This almost invariably has the result of cutting or scoring the underlying surface, which is a particular problem with painted surfaces such pick-up truck beds and requires that the line cut or scored into the truck bed to be repainted before the vehicle can be delivered to the consumer.

DISCLOSURE OF THE INVENTION

The present invention provides a simple and cost-effective method for cutting the protective layer without in any way damaging the underlying area or underlying surface which is intended to be protected.

According to the present invention, there is provided a means for cutting a protective layer which comprises applying a layer of masking material to delineate the surface to which the protective coating is to be applied, and adhesively securing a thin, strong filament of wire or other suitable material to the surface of the masking material along the line of the edge to be trimmed. The ends of the wire are bent away from the surface so that they may be located after the spraying operation is completed.

The coating material may then be applied to the surface to be protected and allowed to cure until the material has enough green strength or in other words is sufficiently cured to be form-retaining and to have developed adequate adhesion strength to the surface to which it has been applied. Adhesion strength is important in that the edge of the coating that remains on the surface must not in any way release during the trimming operation. The exposed end of the wire is located and used to pull the wire away from the surface and up through the protective coating, thereby cutting the protective coating along the masking line, and subsequently removing the masking material, leaving the unmarked surface of the vehicle with the desired coating in place.

The filament used to cut through the coating may vary depending on the force required to cut through the coating. A common music wire with a diameter as small as seven thousandths of an inch (0.007") is adequate for cutting many polyurethane coatings up to a certain thickness and cure time. The masking materials commonly used in the painting and coating of motor vehicle bodies and other surfaces are capable of being applied to both curved and straight lines, to define the surface to be painted or coated. Similarly, the thin filament may be applied along the edge of a curved line to cut the coating material along a curve. A small steel wire size also makes it easy to form and adhere the filament to the surface as it is positioned around tight bends and curvatures. However, a disadvantage of the smaller wire is that it may break while pulling the wire through a thick coating or a harder coating with a high tear strength factor. In this case the filament could be a larger diameter wire size with a higher breaking strength while still maintaining as high a degree of flexibility as possible.

A metal wire with a rectangular or triangular profile could be used. The filament could also be a glass or synthetic fiber, or a strand, consisting of multiple twisted or braided filaments of various materials, profiles and sizes.

The present invention further provides a self-adhesive, filament-bearing tape which is particularly suited to carrying out the method of the present invention, and an apparatus which is adapted to easily and quickly manufacture the said self-adhesive tape.

The present invention also provides an adhesive filament carrying tape which may be applied to the surface to be coated to position both the masking material and the filament at the desired position. In its simplest form, the tape comprises a substrate having at least one adhesive surface which may be removably adhered to the surface to be coated, and a filament releasably adhered to an edge of the substrate. The tape may have a second adhesive surface to which additional masking material may be secured, or may itself be wide enough to act as effective masking material. As with other single or double sided tapes, a non-adhesive release liner may be applied to any adhesive surface to facilitate storage and handling of the masking tape, and removed when required.

The invention also provides a machine adapted to manufacture adhesive tape according to one embodiment of the invention. The machine comprises means for folding an adhesive tape to form a V-shape, means for applying a filament to the bottom of the V, and means for closing the V to secure the filament at the folded edge of the tape. The machine also provides optional means for applying or removing a release layer to the folded tape and for rolling the tape onto a spool for storage and use.

Although the present invention is described with particular reference to the coating of truck bodies, it will be understood that the present invention may be used in many other situations in which a coating must be cut or trimmed after application.

For example, a tub or tank may be manufactured of wood or other suitable materials and made waterproof by spraying on the interior surface a coating of polyurethane or other appropriate material. The method and materials of the present invention may be used not only to trim the edges as required but also to cut any required apertures in the coating for plumbing or other connections.

Another application contemplated for the cutting and trimming method and tape of the present invention is in the trimming of automotive paint, or other paint coatings, when that paint is applied automobile body components or other surfaces on which it is intended to produce a "two-tone" finish, that is, two paint colours meeting at a sharply defined line. The use of the methods and articles of the present inventions results in a superior edge finish when desired over a typical edge finish using the usual methods of the prior art, such as using masking tape. In the methods of the prior art one of the paint coats may be applied and after it is dry masking tape or a similar material is used to define the edge. Paint is applied up to and over the edge defined by the masking tape, and the masking tape is pulled away to cut the coating. The cutting of the coating by the filament of the present invention produces a more precise definition of the edge to the finish coating material. The difference in appearance of the finished edge is the result of cutting through the coating using the wire filament rather than tearing or breaking the coating material by pulling the masking tape away from the surface. The poor edge definition obtained by the use of masking tape often requires the use of a decorative stripe to hide the fuzzy paint edge.

Another application involves a high heat tape capable of withstanding the paint baking temperatures that auto bumpers are subjected to as a post cure phase in the paint process. Poor edge definition is a constant quality control problem in the auto painting process.

The present invention is also capable of application in the moulding industry, particularly in the trimming of moulded materials. When parts are moulded in a closed injection mould, there is typically an allowance in the mould for material to flow beyond the mould to ensure that the cavity is completely filled. The excess material, generally called the flash material, is commonly removed by various cutting methods subsequent to the moulding operation itself. It is contemplated by the present invention that a groove be formed Into the body of the mould at the precise edge of the moulded part corresponding to the edge to be trimmed to remove the flash material A bare wire, which may be square in profile to assist in its retention and to prevent the entry of material into the groove during the moulding operation, may then be placed in this groove in such a way that removal of the wire after the moulding process produces a clean cutting action in the precise location for trimming the flash and at the same time results in a clean groove for the next cycle of use.

The filament may alternatively be applied to, or positioned adjacent, such a groove machined into the mould body by embedding the filament inside an extruded material such as rubber or silicone. In this way, the filament itself could be of a diameter or dimension much smaller than that of the groove and be positioned to be pulled along the inside edge of the groove to produce a cutting line at the appropriate edge of the moulded part.

The aforementioned extrusion could itself be manufactured with a profile that complimented the form of the groove so that the extrusion is held securely in the groove once it has been applied, by means of an interference fit. The filament so incorporated in the extrusion may be separated from the extrusion when pulled, and escapes the groove to complete the cutting process. The extrusion remains in place in the groove until it is removed as the last step before the mould is readied for another cycle.

Grooved moulds may be used, for example, in the fiberglass moulding industry which typically uses open mould processes. The timing of the trimming of a fiberglass part is critical as the part must be cut before the resin cures to a hardness that does not permit the applicator to cut it with a knife.

MODES FOR CARRYING OUT THE INVENTION

The method of the present invention may be more readily understood by referring to the attached drawings.

Referring first to FIGS. 1A through 1F there is shown a self-adhesive tape that is particularly suited to the application of the present invention. The tape 30, as shown in FIGS. 1A through 1F essentially comprises a folded adhesive layer 28, at one edge of which is a filament 24, retained in place by the adhesive layer 28. The adhesive layer may be a non-adhesive substrate coated with a conventional adhesive material, or may, in some circumstances, comprise a film of adhesive material.

As discussed in more detail below, the filament may be retained in place at the edge of the adhesive tape by folding the tape over the filament to envelope the filament within the adhesive tape, as shown in FIGS. 1-1, 1-2, 1-3 and 1-4. As further shown in FIG. 1, a layer or substrate of non-adhesive, easy-to-release material 26 and 27 may be applied to each of the adhesive surfaces of the self-adhesive tape, to permit the tape to be handled and stored without adhering to other materials. The construction of such an adhesive tape is referred to in more detail below.

As can be seen by reference to FIGS. 1A through 1F the adhesive of the present invention may be prepared from conventional, double coated adhesive tapes such as those sold by the 3M Company, which generally comprise an adhesive layer consisting of a substrate coated with an adhesive, and a non-adhesive release layer which is applied to the adhesive layer to protect the adhesive material. The non-adhesive layer is coated on both sides with a release material so that, when the material is rolled as is commonly done, the non-adhesive layer is between each adhesive layer.

To prepare the adhesive tape of the present invention, the release layer applied to a conventional, two-sided adhesive tape may be cut lengthwise, such that the release layer, but not the adhesive layer, is cut and is then bent or folded to bring the exposed adhesive surfaces together. Concurrently, the filament is applied to the adhesive surface at the fold so that, once folded, the filament is located at one edge of the folded tape. One portion of the release layer may be removed, and filament-containing adhesive tape re-rolled to provide the adhesive trimming material of the present invention.

Figure 1A:
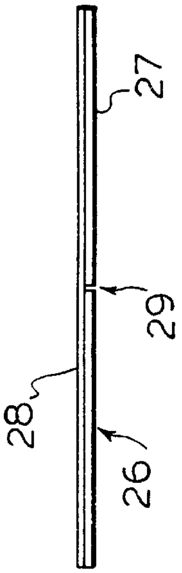
FIGS. 1A through 1F are end views of a piece of adhesive tape of the present invention, showing the stages of preparation of the tape.
Figure 1B:
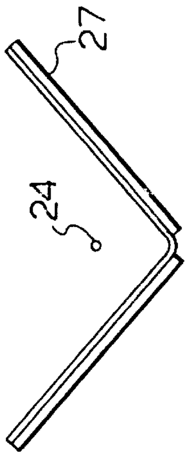
Figure 1C:
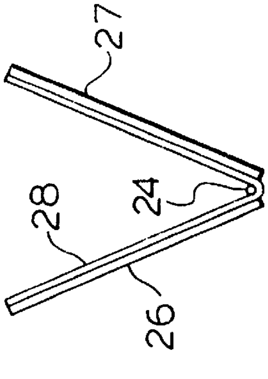
Figure 1D:
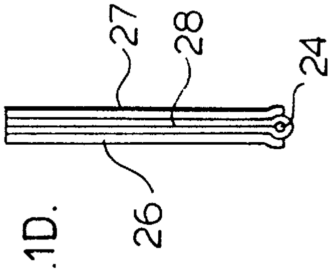
Figure 1E:
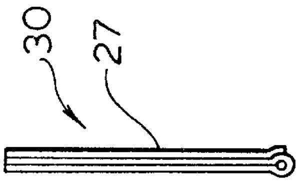
Figure 1F:
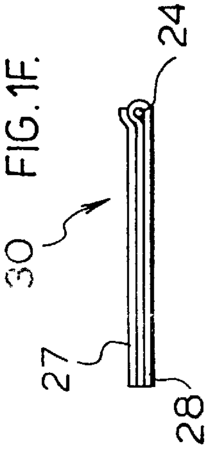
Figures 2A, 2B, 2C, 2D, 2E, 2F:
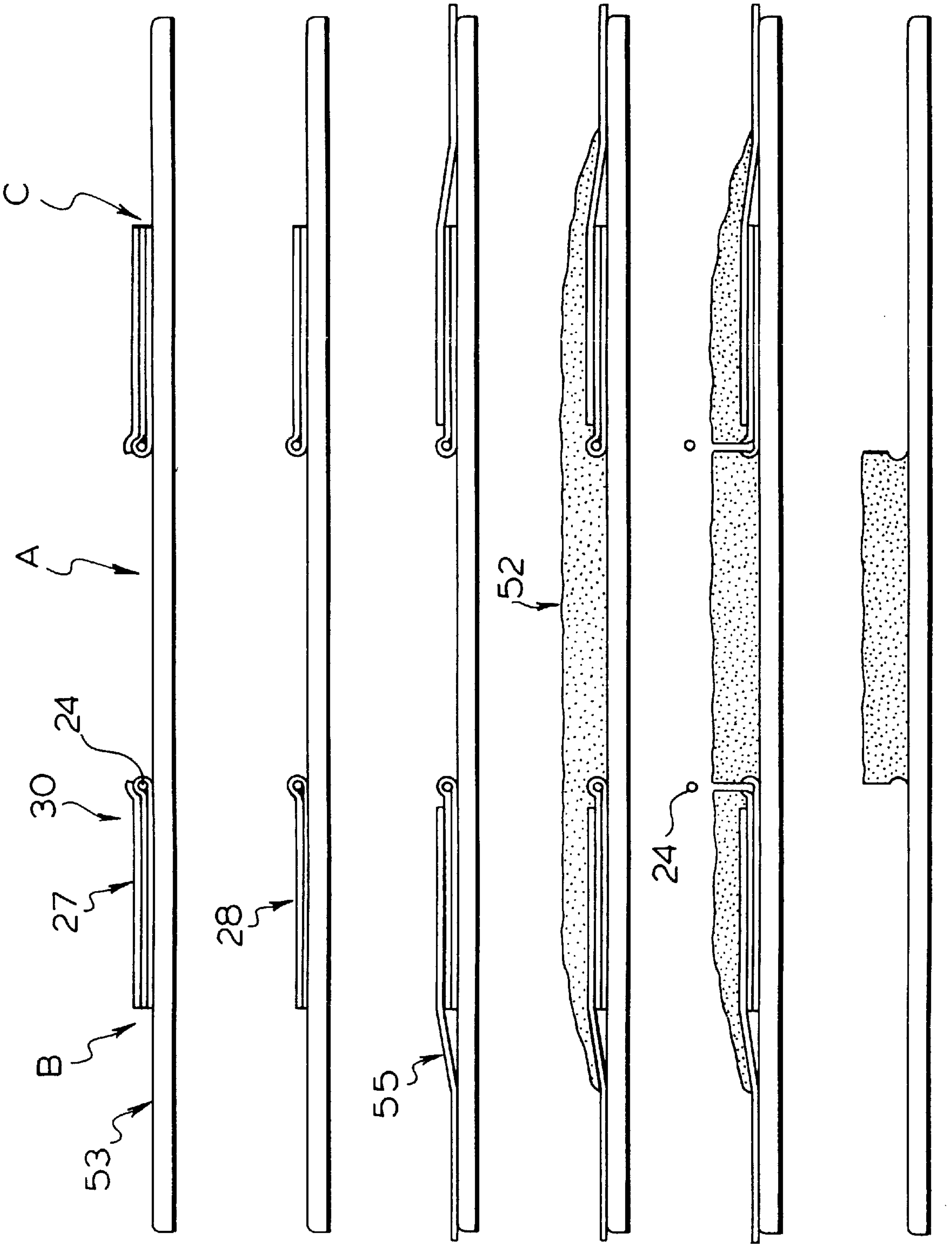
FIGS. 2A through 2F show a method of using the adhesive tape of the present invention.

Referring now to FIGS. 2A through 2F there is shown a surface 53 to which is applied the self-adhesive, filament-containing tape which is particularly suited to the method of the present invention. As shown in FIG. 2A, the surface comprises an area A which is intended to be covered with a protective coating, and Areas B and C which are not intended to be covered with a protective coating.

The tape 30, containing a filament 24, is applied to the surface so that the filament 24 lies along the edge of the area which is to be protected. Additional masking material 55 may be applied to the tape to protect the area which is not to be coated, and adhered to the adhesive layer 28.

The ends of the filament 24 may be left exposed, and extend away from the surface, so that they are accessible after the application of the coating material. As shown in FIG. 24, coating material is applied to the surface, covering the area A and the masking tape 30, and the masking material 55. As soon as the material has cured sufficiently to bond to the surface and maintain a defined edge, the filament 24 is drawn upwardly through the material, cutting the material at the desired location. The masking materials 55 and the tape 30 are then removed, leaving the coating in the desired location.

Figures 3A, 3B, 3C, 3D, 3E, 3F:
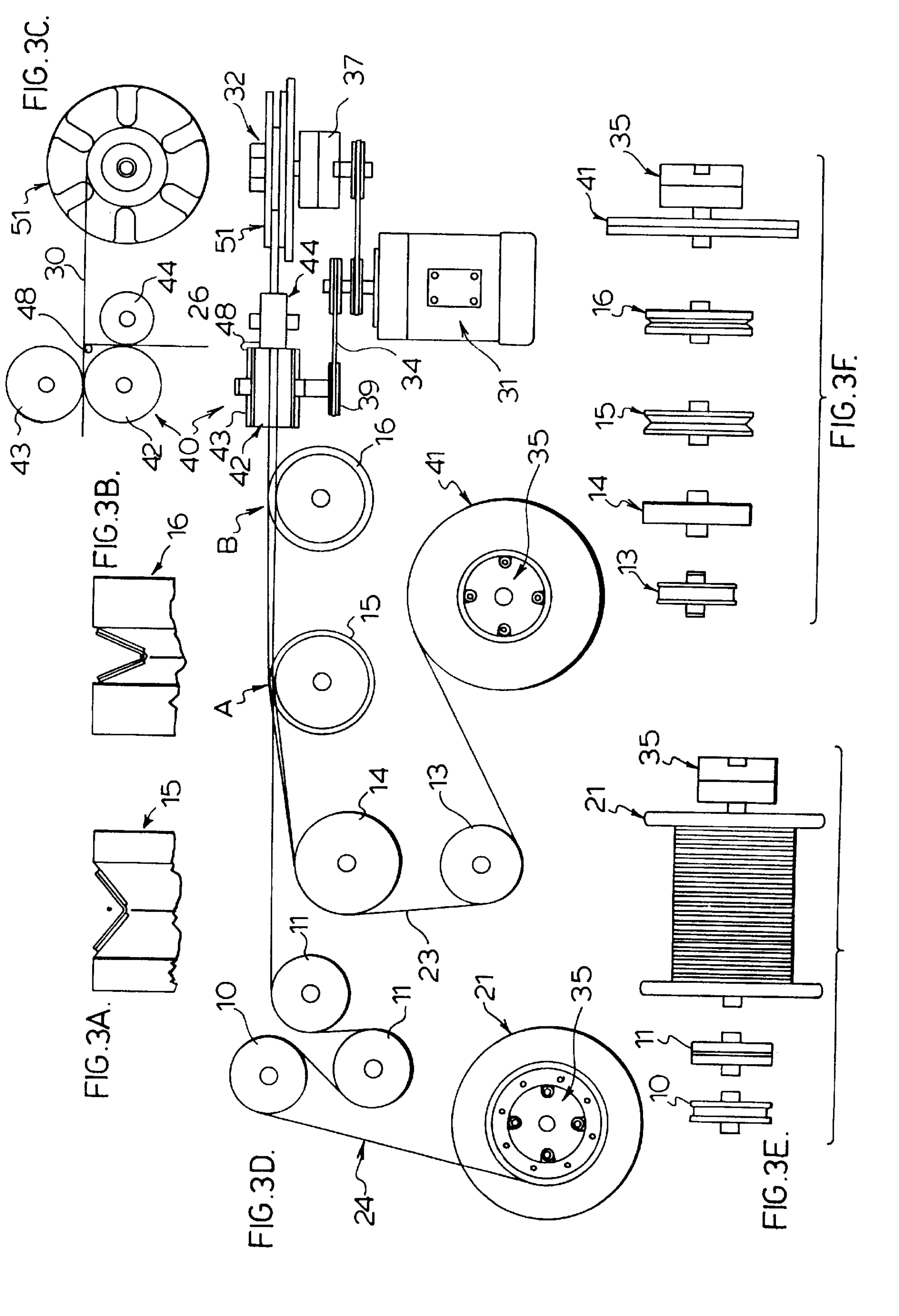
FIG. 3 is a schematic view of an apparatus that may be used to prepare the adhesive tape of the present invention.

Shown in FIG. 3 is an apparatus particularly adapted to manufacture the trimming material of the present invention. According to the present invention, there is provided in FIG. 3 a bulk wire spool 21 rotatively mounted on a spindle, and which may be controlled by a magnetic brake tensioning device 35 which is adapted to maintain relatively constant tension in the wire 24. The wire 24 is conventionally manufactured in a manner that it is wound from side to side on the spool 21, and there are consequently provided a guide wheel 10 and wire positioning wheels 11 that are intended to centre the wire as it is unwound from the spool 21. Also provided is a bulk roll 41 of adhesive tape, with a center slit release liner, which may also be controlled by a magnetic brake tensioning device 35. Both the wire 24 and the tape 23 are pulled through the apparatus of the present invention by the drive apparatus 40 described in more detail below.

As the wire 24 is unwound from the bulk roll 21, it is centered by guide wheel 10 and positioning wheels 11 so that it is positioned directly above the center of the adhesive tape 23. As the tape 23 passes over wheels 14, 15 and 16, it is folded by the increasingly steep V-groove of wheels 15 and 16 about the center slit, and the filament 24 is brought into contact with the adhesive tape 23 and forced into an adhesive contact with tape 23 immediately above the center of the liner.

It should be noted that while the rotating wheels 13, 14, 15 and 16 are shown in FIG. 3, stationary guide posts or other appropriate means for progressively folding the tape could be used.

The tape 23 now in contact with the filament 24 passes through a drive assembly generally designated as 40 and comprising drive wheels 42 and 43, which force the adhesive sides of the tape 23 together, and pull both the tape 23 and filament 24 through the apparatus. One portion of the release liner 26 may be removed at this point by the use of an additional drive wheel 44, which pulls the liner 26 around a guide post 48 and leaves one adhesive side of the adhesive tape 30 exposed. The filament containing adhesive tape 30 is then rolled on to spools 51. The drive mechanism comprises a motor 31, suitably connected by belts and pulleys to the drive mechanism 40 and the winding mechanism 50, to pull the material through the apparatus and cause it to be rewound on spools containing an appropriate amount of the material.

It will be understood, of course, that modifications to the apparatus disclosed above would be relatively apparent to one skilled in the art, and could be made without departing from the spirit or substance of the invention herein described. In particular, the present invention contemplates embodiments in which the substrate to which the filament is to be applied is itself the adhesive layer, so that one layer of the lining or masking layer is avoided. In addition, the filament may be applied to the adhesive substrate in situ, that is, after the adhesive substrate is applied to the surface to be coated, or contemporaneously with the application of the substrate to that surface.

I claim:

1. A filament-bearing adhesive tape comprising an elongate substrate folded onto itself so as to form a folded edge, a first exterior surface and a second exterior surface opposite said first exterior surface, each of said first and second exterior surfaces having an adhesive on at least a portion thereof, a filament enveloped and releasably secured within said substrate along said folded edge and between said first and second exterior surfaces, and a non-adhesive release liner removably secured to said first exterior surface.

2. The filament-bearing adhesive tape of claim 1, wherein said tape is rolled upon itself a plurality of times such that each subsequent roll has a circumference larger than the previous roll so as to form a spool of tape, and wherein said non-adhesive release liner of a first roll portion of said spool of tape contacts said second surface of a second roll portion of said spool of tape.

3. The filament-bearing adhesive tape of claim 1, further comprising a second non-adhesive release liner removably secured to said second surface.

* * * * *